3,059,023
PROCESS FOR THE PRODUCTION OF CHLORINE
AND BROMINE SUBSTITUTED CARBAMATES
Karlheinz Rink, Hanau (Main), Germany, and Adolf
Weihe, deceased, late of Hochst, Odenwald, Germany,
by Elsbeth Weihe, wife and sole heir, Hochst, Odenwald, Germany, assignors to Deutsche Gold- und Silber-Scheideanstalt vormals Roessler, Frankfurt am Main, Germany
No Drawing. Filed July 18, 1960, Ser. No. 43,684
Claims priority, application Germany July 31, 1958
9 Claims. (Cl. 260—482)

The present invention relates to an improved process for the production of chlorine and bromine substituted carbamates.

The present application is a continuation-in-part application of Serial No. 830,213, filed July 29, 1959, now abandoned.

The object of the present invention is to produce chlorine and bromine substituted carbamates more readily than has been hitherto possible.

It is known to the art that when cyanogen chloride is reacted with ethanol a mixed product is obtained which consists of diethyl carbonate, ethyl carbamate, a little ethyl chloride and ammonium chloride. Furthermore, it is also known, as disclosed in U.S. 2,771,485, that when cyanogen chloride is reacted with compounds which contain at least two hydroxyl groups, at increased temperature and if necessary at increased pressure, carbamic acid esters containing chlorine are produced which are contaminated with other products. If necessary, the process described in U.S. 2,771,485 can be conducted in a fused mass of the multi hydroxy group containing starting materials or it can be carried out in the presence of an organic solvent, such as glacial acetic acid or benzene. German Patent 926,549 discloses the use of increased pressure in conjunction with the process of U.S. 2,771,485.

It has now been found that the disadvantages involved in the use of these prior art processes can be avoided if the reaction between the cyanogen halide, preferably cyanogen chloride or cyanogen bromide, and an organic compound containing two hydroxyl groups is carried out in the presence of a halogen halide, preferably hydrogen chloride or hydrogen bromide, or aluminum chloride. By means of the process of the present invention it is thus possible to produce halide substituted carbamates without the use of pressure and at relatively much lower temperatures than are required by the prior art. Furthermore, by being able to work at lower temperatures it is now possible to readily use liquid rather than gaseous cyanogen halides as the starting materials.

By means of the process of this invention it is possible to produce very pure products in good yields.

Although the reaction can be effectively conducted within the temperature range of −10 to +70° C. it is of particular advantage to work at room temperature. At temperatures over +70° C. and at normal pressure the speed of the reaction decreases and in addition small amounts of cyanuric halides will form as by-products.

The hydrogen halide or aluminum chloride which is present during the reaction acts as a catalyst and is used in an amount of 10–30% by weight with reference to the cyanogen halide, preferentially 15–20% by weight of the catalysts are applicable. It is advantageous in this respect to use about a 10–20% excess of the cyanogen halide.

Basically there are three possible courses of reaction that may be encountered according to the present invention depending upon the type of diol compound used as the starting material. Halide substituted diols can also be used as the starting materials. These three reaction possibilities will be diagrammed and discussed below and are to be designated as reactions A, B and C, respectively.

Reaction A will occur with aliphatic diols whose OH groups are separated by two or three carbon atoms. These compounds would include such materials as ethylene glycol, the 1,2 and 1,3 propane diols, the 1,2; 2,3 and 1,3 butane diols, phenyl glycol, and the like. When this type of compound is used as the starting material no side products are formed in reaction A. Reaction A probably involves the formation of an intermediate cyclic compound which in turn is rearranged into the final halogen substituted carbamate compound as follows:

$$HO-R-OH + (XCN + HX \rightleftharpoons X_2C=NH) \longrightarrow$$

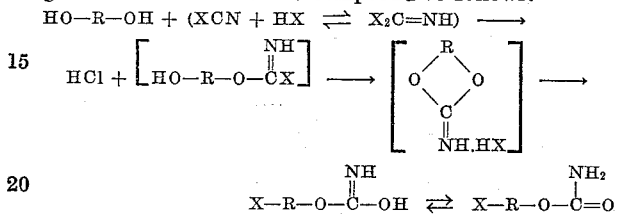

wherein X is chlorine or bromine and R is an aliphatic organic radical. Because of the uncertainty of the mechanics of the use of the cyanogen halide with the hydrogen halide in all three reactions, the relation between these two compounds in all the reactions has been expressed in equilibrium form and enclosed in parentheses. In addition, in this and the following reactions, the material in square brackets represents assumed intermediate compounds which have not been isolated to date. When the starting material is 1,3 propane diol the intermediate ring structure is probably

and the final product is $$Cl-(CH_2)_3-O-CO-NH_2$$

or ω chloro propyl carbamate.

Reaction B will occur with aliphatic diol compounds whose OH groups are separated by more than three carbon atoms. These compounds would include such materials as 1,4 butane diol, 1,6 hexane diol, diethylene glycol, p-xylylene glycol and the like. In this reaction an intermolecular, intermediate ring formation cannot take place due to the spatial and statistical features of the compounds employed. Instead, somewhat unstable intermediate chain type polymers are formed, which, under the normal conditions employed in this invention or by a subsequent treatment with hot water, decompose into ω halogen substituted carbamates. In addition, during the decomposition of these polymers dicarbamates and equivalent quantities of dihalo substituted aliphatic hydrocarbons are also formed. Reaction B proceeds as follows:

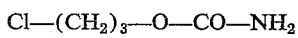
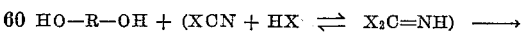
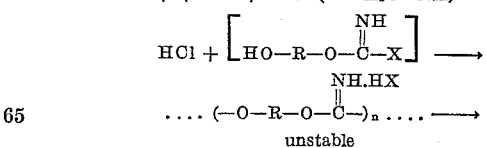
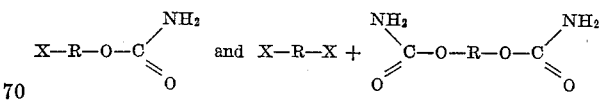

In reaction B, X represents either chlorine or bromine and R is an aliphatic organic radical.

Reaction C involves the use of aromatic diol compounds whose OH groups are separated by more than three carbon atoms. These compounds would include such materials as hydroquinone, diphenylol propane and the like. Where aromatic diols are used such as pyrocatechol and resorcinol in which the OH groups are separated by only two or three carbon atoms the reaction probably proceeds as in reaction A with the formation of an intermediate ring structure. However, in reaction C no intermediate ring structure is formed. Instead, the reaction proceeds as in reaction B with the formation of chain type polymers with the notable exception however that the chain polymers in reaction C are much more stable than those formed in reaction B due to their much higher molecular weights and therefore do not decompose very readily. Reaction C proceeds as follows:

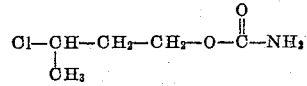

In reaction C, X represents either chlorine or bromine and R is an aromatic radical.

The process of the present invention can be conducted in inert organic solvents or dispersion mediums such as ethyl ether, benzene, dioxane, tetrahydrofurane, carbon tetrachloride, chloroform, methylene chloride, benzine and the like. In addition, aqueous solutions of hydrohalic acids can also be used as the solvent. In this instance the dissolved hydrogen halide also acts as a catalyst.

The process of the invention can also be conducted in the absence of a solvent or dispersion agent.

The halogen substituted carbamates are compounds which are marked with a very great tendency to react with other compounds. As such, they can be transformed into valuable technical products, for example, polymerized products and pharmaceutical products.

They can be further used as insecticides, fungicides and the like.

The following examples are not intended as limitations upon the scope of the present invention.

*Example 1*

372 g. (6 mols) of ethylene glycol were suspended, by stirring, in 1200 ccm. of ethyl ether and the suspension was then simultaneously saturated at 20° C. with cyanogen chloride and hydrogen chloride.

The reaction terminated within 3½ to 4 hours. The ethyl ether was distilled off, on a water bath, from the β chloro ethyl carbamate which had already partially precipitated out during the reaction. The reaction product which remained as the distillation residue was in the form of snow white crystals. The crystals were dried on clay. The yield of 730 g. was 99% of the theoretical. The product was contaminated by about 3% ammonium chloride which could be removed by recrystallization from water or even more preferably by extracting with acetone and then vaporizing the acetone from the extract. The melting point of the recovered carbamate was 67–69° C.

When the same reaction was conducted in other solvents such as benzene, carbon tetrachloride, dioxane and the like instead of ethyl ether, the yields of the β chloro ethyl carbamate were still over 90%.

*Example 2*

90 g. (1 mol) of 1,3-butylene glycol were suspended by stirring in 200 ccm. of ethyl ether and cyanogen chloride and hydrogen chloride were simultaneously introduced at 20° C. into the suspension until the weight of the suspension had increased about 80 g. This required about 2 hours. The ethyl ether was then distilled off from the product which already partially crystallized during the reaction. On cooling, the distillation residue assumed the form of a solid, snow white crystalline mass. It was dried on clay. The yield, 138 g., was 91% of the theoretical. The crystalline product was barely contaminated with ammonium chloride, from which it was freed in the manner described in Example 1. The melting point of the purified ω chloro isobutyl carbamate was 72° C.

The product had the formula

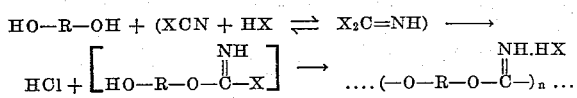

*Example 3*

22 g. of cyanogen bromide were dissolved in 200 ccm. of ethyl ether and 12.5 g. of ethylene glycol were suspended in this solution with stirring at 30° C. Hydrogen bromide was then introduced into the suspended system for 1 hour. The mixture was allowed to stand at 20° C. for 15 hours after which the ethyl ether was distilled off on a water bath. 17 g. of β bromo ethyl carbamate in the form of yellow crystals remained as the residue. Upon being recrystallized from water, the product was recovered in the form of pure white crystals with a melting point of 52–54° C.

*Example 4*

60 g. of cyanogen chloride were introduced within an hour at 20° C. into a stirred suspension of 61 g. of ethylene glycol, 200 ccm. of ethyl ether and 12 g. of anhydrous aluminum chloride. The mixture was stirred for two hours after which the ether layer was removed, filtered and distilled off on a water bath. After being dried, the distillation residue amounted to 23 g. of β chloro ethyl carbamate with a melting point of 65–66° C.

*Example 5*

61 g. of ethylene glycol were disolved in 50 ccm. of concentrated hydrochloric acid. The solution was then cooled to −5° C. and within two hours 60 g. of cyanogen chloride were introduced, with stirring, into the cooled solution. A white crystalline slurry of β chloro ethyl carbamate was obtained. The product was removed on a suction filter, washed with a little water, dried and recrystallized from acetone. Yield: 38 g. Melting point: 62–69° C.

*Example 6*

69 g. of phenyl glycol were disolved in 250 ccm. of ethyl ether by warming on a water bath. Cyanogen chloride and hydrogen chloride were then introduced into this solution at 30° C. for two hours with stirring. The mixture was stirred for an additional hour at 30° C. and then the ethyl ether was distilled off on the water bath. The ocher colored, oily residue was recrystallized from acetone. The recrystallized product was pure white, crystalline β,β phenyl chloro ethyl carbamate which was somewhat contaminated with cyanuric chloride formed in a side reaction. Yield: 84 g. Melting point: 135–140° C.

The product had the formula:

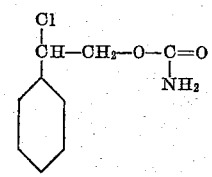

*Example 7*

90 g. of 1,4 butane diol were suspended with stirring in 200 ccm. of ethyl ether. Cyanogen chloride and hydrogen chloride were then introduced into the suspension at a temperature of 0° to +5° C. until the weight of the suspension increased 75 g. The mixture was then further stirred for an hour at 20° C. after which the ether was completely distilled off on a water bath. The residue in turn was heated with 500 ccm. of water. As described above with reference to reaction B, ω chloro butyl carbamates and 1,4 butane dicarbamates were thereby formed which went into solution and 1,4 dichloro butanes, which were also formed, remained undissolved and were separated from the aqueous phase as a slightly yellow colored oil. Water was then evaporated off from the aqueous phase to dryness and the residue was completely dried and extracted with methylene chloride. The 1,4 butane dicarbamate was insoluble in this solvent and was readily recovered therefrom. It was dried on clay and its yield was 22 g. It had a melting point of 180–182° C. Its formula was

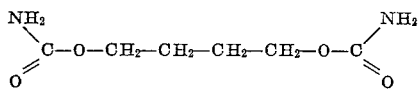

ω chloro butyl carbamate was obtained as a residue, after being dried, after distilling off the methylene chloride from the methylene chloride extraction solution. The yield of ω chloro butyl carbamate was 68 g. or 45% of the theoretical. It had a melting point of 54–56° C. and its formula was

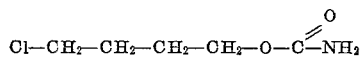

*Example 8*

53 g. of diethylene glycol were suspended in a solution of 30 g. of cyanogen chloride in 200 ccm. of ethyl ether by stirring and thereafter, hydrogen chloride was introduced into such solution for 1 hour at −10° C. The mixture was stirred for an additional hour at 20° C. and then the ethyl ether was distilled off on a water bath. The distillation residue was a yellow colored, viscous soft resin of 2 (ω chloro ethoxy) ethyl carbamate, which was the main product.

The structure of this product was

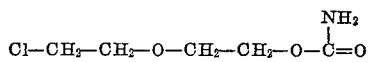

The main product was accompanied with the following two side products

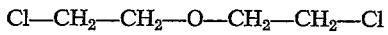

and

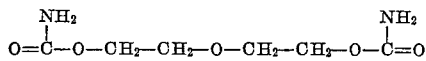

After storage for several days the reaction mixture begins to crystallize. The three compounds may be isolated as shown in Example 7.

*Example 9*

59 g. of 2,2-diphenylol propane

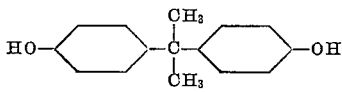

were dissolved in 200 ccm. of ethyl ether and for two hours cyanogen chloride and hydrogen chloride were introduced into the solution with stirring at 30° C. The mixture was stirred for an additional 2 hours and then the ethyl ether was distilled off on a water bath. The distillation residue was a brittle, light resin of poly 2,2-diphenoxy propane carbimino hydrochloride, the structure of which was

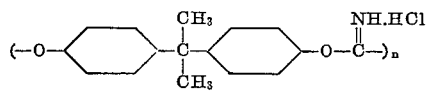

*Example 10*

Example 1 was repeated except that no ethyl ether was used. The yield was 20 percent.

*Example 11*

50 g. of β chloro ethyl carbamate were heated under reflux with stirring for ½ hour with 50 ccm. of a 40% aqueous solution of formaldehyde. Thereafter, the mixture was distilled on an oil bath in a vacuum (18 mm. Hg) and the residue was condensed at 18 mm. Hg for 2 hours at 120° C. In this manner a colorless, high viscous soft resin was obtained which was stable to water at room temperature but which was hydrolyzable with hot water. The formaldehyde condensation product was poly ω chloro ethoxy methyl carbamyl and had the structure

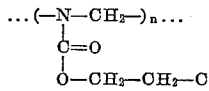

Resins, such as those produced by the formaldehyde condensation reaction illustrated in Example 11, have particular utility where it is desirable to coat an article with an easily removable protective coating.

The reactions involved in Examples 1 to 6 and 10 proceeded as illustrated above for reaction A. Reaction B was involved in Examples 7 and 8 and reaction C was involved in Example 9.

Reaction A which occurs with aliphatic diols also takes place with 1,2- or 1,3-diols which are further substituted by e.g. halogen, alkyl, aryl, alkoxy radicals and the like.

The compounds which react as shown in scheme B may also have further substituents.

Reaction C: Following the procedure described in Example 9 the following compounds can be converted to the corresponding reaction products as shown in scheme C:

1,4-diphenylol sulphone

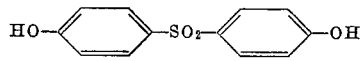

1,4-diphenyl diol

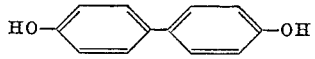

1,4-diisobutyl diphenylol methan

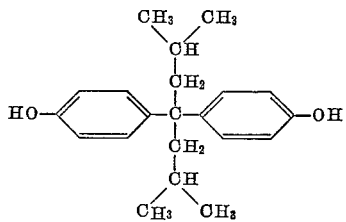

Naphthaline-1,4-diol

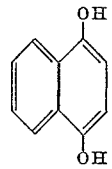

Using hydroquinone as starting diol a polymer was obtained which did not melt and was insoluble in all common solvents.

We claim:

1. In a process for the production of chlorine and bromine substituted carbamic acid esters by reacting an organic compound selected from the group consisting of aliphatic and aromatic diols, the hydroxy groups of which are positioned on separate carbon atoms, with a cyanogen halide selected from the group consisting of cyanogen chloride and cyanogen bromide, the step of carrying out such reaction in the presence of a catalyst selected from the group consisting of hydrogen chloride, hydrogen bromide and aluminum chloride at atmospheric pressure and a temperature between −10 and +70° C.

2. The process of claim 1 in which the hydroxy groups in said organic compound are separated by 2 to 3 carbon atoms.

3. The process of claim 1 in which the hydroxy groups in said organic compound are separated by at least 4 carbon atoms.

4. The process of claim 1 in which said reaction is conducted in an inert organic liquid medium.

5. The process of claim 1 in which said reaction is conducted in an aqueous solution of said catalyst.

6. The process of claim 1 in which said reaction is conducted in the absence of a solvent.

7. The process of claim 1 in which said reaction is conducted at about 20° C.

8. The process of claim 1 in which an excess of said cyanogen halide is used.

9. The process of claim 8 in which said excess is 10–20%.

References Cited in the file of this patent

UNITED STATES PATENTS

| | | |
|---|---|---|
| 2,553,564 | Fein et al. | May 22, 1951 |
| 2,771,485 | Weike et al. | Nov. 20, 1956 |